Aug. 30, 1966  C. W. UNGEHEUER  3,268,935
ADJUSTABLE SUPPORT FOR A POWER DEVICE
Filed Feb. 8, 1965  2 Sheets-Sheet 1
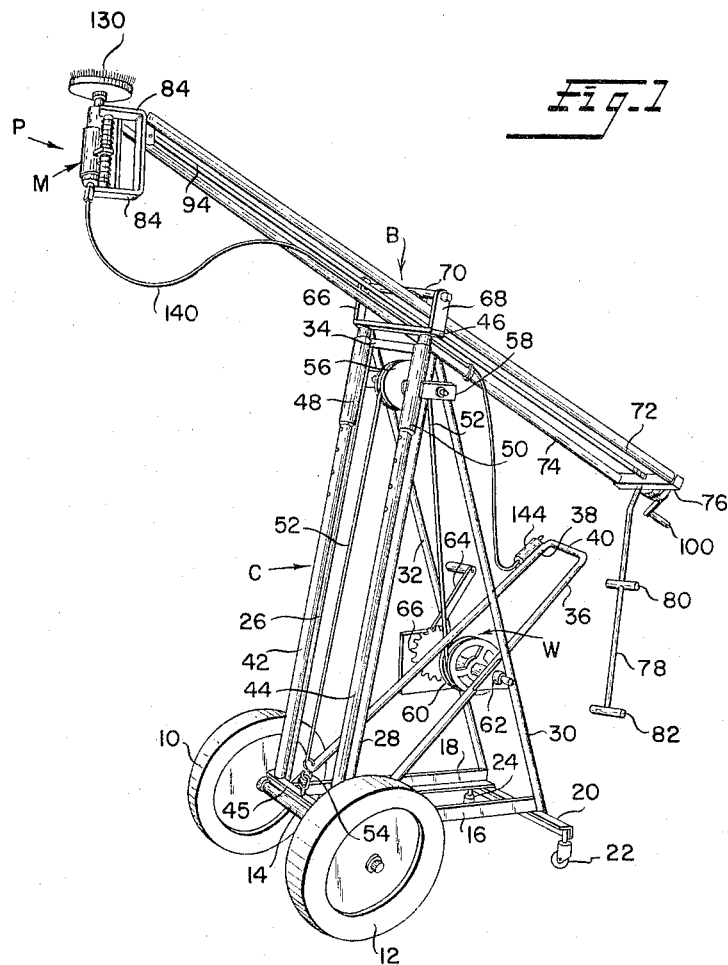
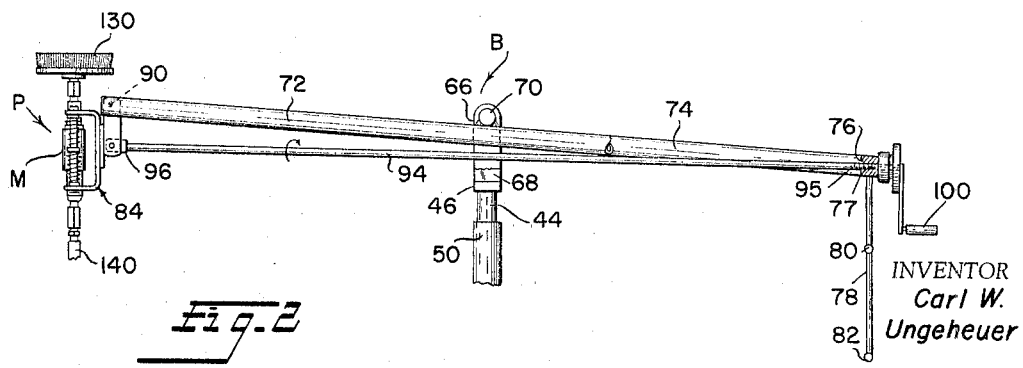
INVENTOR
Carl W. Ungeheuer
BY *Shlesinger, Shlesinger & Arkwright*
ATTORNEYS Aug. 30, 1966　　　C. W. UNGEHEUER　　　3,268,935
ADJUSTABLE SUPPORT FOR A POWER DEVICE
Filed Feb. 8, 1965　　　　　　　　　　　　　2 Sheets-Sheet 2

INVENTOR
Carl W. Ungeheuer

BY *Shlesinger, Shlesinger & Arkwright*
ATTORNEYS

United States Patent Office 3,268,935
Patented August 30, 1966

3,268,935
ADJUSTABLE SUPPORT FOR A POWER DEVICE
Carl William Ungeheuer, 175—20 Henley Road,
Jamaica, N.Y.
Filed Feb. 8, 1965, Ser. No. 430,806
9 Claims. (Cl. 15—21)

This invention relates to powered work assembly supports and more particularly to units which have a support structure enabling an operator to readily work on normally inaccessible elevated areas with a power tool.

Heretofore, there has been a problem encountered in reaching high elevated surfaces with power tools so that the operator could accurately position and hold the power tool in a desired position and orientation. There is a need for a simple lightweight structure which can adequately support the tool and simultaneously allow a manual operator to accurately and easily control the position of the power unit.

Accordingly, it is a primary object of this invention to provide a support structure for a power unit which will enable an operator to readily engage elevated work areas and to simultaneously control the angular disposition of the unit.

It is another object of this invention to provide a support structure for a power unit which will be of lightweight construction and can readily be moved from one area to another.

Another object is to allow an operator to reach high areas without requiring cumbersome scaffolding.

A further object of this invention is to provide a support structure on which the power unit is pivotally supported and has a mechanical adjusting means for allowing an operator to move the power units to any desired angular position.

A still further object of this invention is to provide a support structure for a power assembly with a pivoted boom construction which supports a power assembly and is manually operable so that the power assembly can be quickly swung from one work area to another as desired.

A still further object of this invention is to provide a fixed control means for tilting the work assembly to a desired inclination.

A still further object of this invention is to provide a simple carriage arrangement which will be vertically adjustable and wherein the power unit is resiliently mounted to assure an even pressure of the unit on an uneven work surface.

Another object of this invention is to provide a portable support structure with a compact work assembly having a rotary powered brush which can be used to clean angularly inclined surfaces.

A still further object of this invention is to provide a compact powered work assembly having a disc-type tool directly supported by a motor which is pivotally mounted on a support structure.

These and other objects and advantages of this invention will become apparent to those skilled in the art from the drawings and from the following description of this invention.

In the drawings:

FIGURE 1 shows a perspective view of this invention.

FIGURE 2 shows a side view of the boom assembly.

Figure 3:
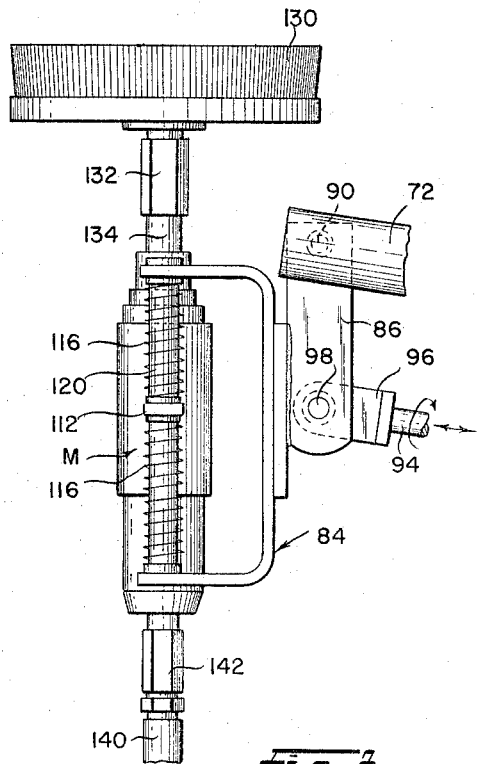
FIGURE 3 shows a side view of the power unit assembly illustrating the mounting of the motor and the pivotal connection of the yoke to the boom assembly.

Referring particularly to the drawings, FIGURE 1 shows the carriage generally indicated at C having a pair of wheels 10 and 12 mounted on axle bar 14 supporting a frame assembly having a pair of horizontal backwardly extending parallel angle iron frame members 16 and 18 which are integral with axle bar 14 at the front thereof and with rear cross bar 20 at the rear thereof which supports a pair of casters 22 and 24.

A pair of front upright standard bars 26 and 28 are integral at their lower end with horizontal angle iron frame members 16 and 18. A pair of parallel rear diagonal support bars 30 and 32 extend upwardly from the rear of the parallel frame bars 16 and 18 to join the top of the upright standard bars 26 and 28 thereby forming a pair of triangular shaped support sections. These sections are joined by a top connecting bar 34. This frame arrangement gives a simple and strong support structure.

A U-shaped elongated handle and cross brace member having sides 36 and 38 which are joined respectively at the front portions of angle iron frame bars 16 and 18, extend upwardly crossing the rear diagonal support bars 30 and 32 respectively and continue outward to handle section 40 which is approximately the waist height of an operator.

Handle section 40 makes it possible for an operator to easily move the carriage from one place to another or to easily turn the carriage on the casters as desired.

A vertical elevating assembly consisting of a pair of long tubular bars 42 and 44 are supported along the front of upright standards 26 and 28 and are joined together at their ends by lower and upper cross bars 45 and 46 to make a rigid rectangular frame which is slidable up and down along the front of upright standards 26 and 28.

A pair of tubular holding members 48 and 50 are rigidly fastened to upright standards 26 and 28 and telescopically receive the long tubular bars 42 and 44, supporting them in a close sliding fit while permitting them to move up and down along the upright standard bars 26 and 28.

The upright tubular members 42 and 44 can be held in a given vertical position by any fastening means. The illustrated structure uses a pin which extends through a plurality of holes in tubular member 42 and rests on the top of the tubular support 48.

The vertical assembly is raised and lowered by a cable 52 which is connected to the lower cross bar 45 of the vertical frame through a bolt connection 54.

The cable 52 is passed upwardly over a pulley 56 and down to a winch assembly generally indicated at W.

The pulley 56 is rotatably mounted on an axle which is supported at each end on a bracket member 58 adjacent the apex of each of the triangular frame sections.

The cable is passed over a winding wheel 60 of the winch assembly which is fixedly supported on a shaft 62 which is wound by a crank 64 which has a ratchet assembly 66 connected therewith.

The boom assembly generally indicated at B is pivotally connected to a pair of upright lug members 66 and 68 which provide support for the ends of pivot bar 70 of the boom assembly B.

A pair of elongated rod members 72 and 74 are welded to the pivot bar 70 at their central portion and are connected at the end adjacent the operator by a cross member 76. A power work assembly P is pivotally connected to elongated bar members 72 and 74 at their other end. A depending handle section 78 is attached to connecting cross bar 76 and has handle pieces 80 and 82 one of which is used by the operator depending upon the vertical height to which the elevator assembly is raised.

Figure 4:
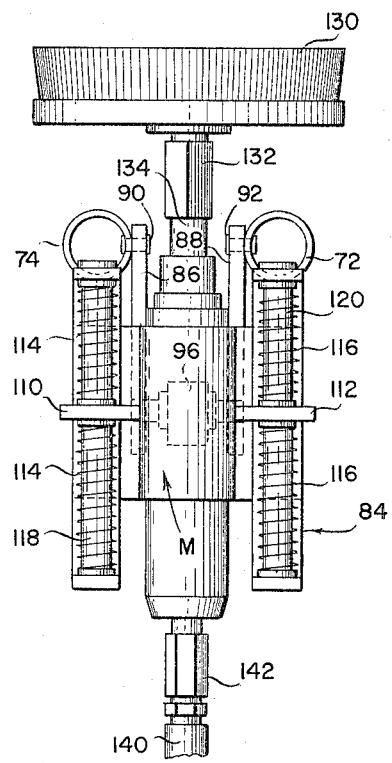
FIGURE 4 is a face view of the power assembly.

Referring to the power work assembly P, support yoke 84 as shown in FIGURES 3 and 4 has a pair of connecting members 86 and 88 rigidly connected thereto which are pivotally connected to elongated tubular boom members 72 and 74 by pins 90 and 92.

The yoke 84 is moved through a pivoted arc by a crank assembly having an elongated pivoting rod 94 which is rotatably held in a pivoted socket 96 and is freely rotatable therein. Socket 96 is pivotally connected to links 86 and 88 by a connecting pin 98. When the elongated pivoting rod 94 is moved either inwardly or outwardly by rotation thereof, the links 86 and 88 are pivoted about their respective pins 90 and 92 thereby permitting the inclination of the yoke 84 to be varied.

Referring to FIGURE 2, it can be seen that rotational movement of the crank 100 will rotate elongated pivoting rod 94 so that threaded section 95 which engages the threaded section 77 of fixed cross member 76 will move elongated rod 94 axially thereby tilting the power work assembly P which is supported by the yoke 84.

In this manner it is extremely simple for an operator to accurately adjust the angular inclination of the power work assembly P, and because of the crank arrangement, the elongated pivoting rod 94 will rigidly support the work assembly in that desired inclination.

Figure 5:
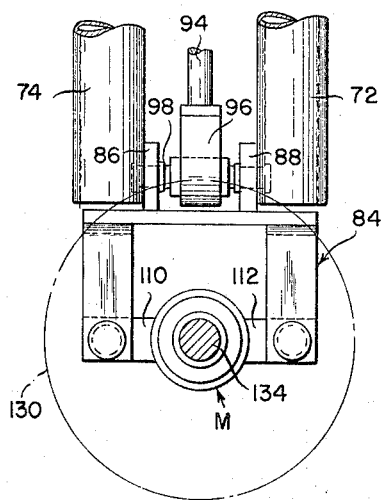
FIGURE 5 is a bottom view of the power assembly showing the connection of the pivot bar.

FIGURES 3, 4 and 5 show in detail the mounting arrangement of the work assembly.

The motor M shown mounted on the yoke assembly 84 has integral projecting lugs 110 and 112 which are supported by spring assemblies 114 and 116 through which pins 118 and 120 extend. Pins 118 and 120 are supported on the outwardly extending arms of yoke 84.

A rotatable work instrument such as a brush 130 is shown directly mounted by means of a coupling 132 on the upwardly extending shaft 134 of motor M. This arrangement gives direct support to the rotary brush 130 and a compact arrangement so that the pivoting of yoke member 84 will directly incline the surface of rotary brush 130 to any desired planar inclination.

The spring support arrangement using spring assemblies 114 and 116 enable the motor M and the rotary brush 130 to be resiliently supported in a floating manner to provide a means of allowing the rotary brush 130 to readily move downwardly away from the work surface when sudden pressure is applied to the boom, or when the rotary brush encounters a protruding surface. Similarly when a depression in the work surface is encountered the brush 130 will still be held in engagement therewith.

A rotary brush 130 is shown so that the unit can be used for cleaning elevated surfaces, however it should be understood that any type of working tool such as a rotary grinding disc or other instrument could be attached to the motor.

Motor M is an air motor which has a high pressure supply line 140 attached thereto by means of a coupling 142. The compressed air supply line extends back from the air motor along the boom and down to the frame handle member 38 where it is connected to an air switch 144. The air switch 144 is adapted to be connected to a conventional compressed-air supply line. The operator merely presses the switch to activate the air motor M.

It is also possible to mount a different type of power unit, such as an electric motor in place of the air motor M if desired. One of the advantages of the air motor however, is that it can be used in areas having explosive fumes and which would be ordinarily hazardous if an ordinary electric motor were used.

One of the uses for this invention is in the cleaning of jet aircraft wing surfaces adjacent the jet engines where a hard carbon deposit accumulates very quickly and is very difficult to remove. The ability to raise the rotary brush to a desired height very quickly and to tilt the brush to a desired angular inclination makes this unit extremely effective in cleaning these deposits from the aircraft, since an even steady pressure can be applied to the surface through the rotating brush. It is also possible to power such brush without ordinary hazards encountered with an electric motor by making it possible to use air motor to power the brush.

It can readily be seen that this unit has many other uses where an operator would desire to accurately position a working instrument against the work surface which is normally out of his reach without having to use scaffolding, and wherein the operator can quickly move the unit from one work area to another.

*Operation*

The portable power cleaning shown in these figures is wheeled by an operator from one working spot to another by pushing on the handle 40. An air line, not shown, is connected to the air switch 144 to supply air pressure to motor M.

When the desired position is reached by the operator he turns the crank 64 to raise the elevator assembly upward to a position which will enable the operator to swing the boom B assembly slightly upward to contact the work surface. The operator then inserts the pin 52, shown in FIGURE 2, through the exposed hole above the tubular members 48 and 50 to lock the elevator assembly at the desired height.

Then the operator moves the power work assembly P upward toward the work surface by pulling downward on the boom assembly handle 78. When the rotatable disc-type brush engages the area, the operator can see the necessary angular inclination required to have the entire working surface of the brush engage the work surface. By turning the crank 100 of the boom assembly, he is able to move the elongated pivoting rod 94 either outward or inward to vary the angular disposition of the yoke 84 about the pivot pins 90 and 92 thus inclining the surface of the rotatable brush 130 to any desired plane.

In working on separate areas which have the same general inclination at height from the ground, it is simple for the operator when finished in one surface to merely lower the power work assembly P by lowering the end of the boom assembly B and simply wheeling the carriage to the second location where the boom is merely raised and the work on the second section can proceed immediately without losing time for adjustment.

It should be noted that the operator has full and complete control of the work, and that the unit can be used over an extremely wide area because of the swing of the boom and the wheel and caster arrangement wherein the operator by merely pushing on the handle can move the brush along, or if desired can pivot the carriage on wheels 10 and 12. This is possible because the assembly is light and compact.

The boom assembly gives the operator extremely good control in raising and lowering the unit so that no time is lost in making a special adjustment where there is an irregular surface having varying heights.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:
1. A power machine, comprising:
   (a) a wheeled frame having a pair of upright standard bars;
   (b) a vertically movable elevating assembly reciprocably supported by said standard bars and having a pivot assembly adjacent the top thereof;

(c) an elongated boom having a central section connected to said pivot assembly and extending at its forward end beyond said wheeled frame;
(d) the forward end of said boom having a power tool assembly pivotally connected thereto;
(e) the rear end of said boom having a handle which enables an operator to swing the boom in an arc about said pivotal connection to position the forward end of said boom; and
(f) control means connected to the power tool for adjusting its disposition about its pivotal connection to the forward end of the boom.

2. The power machine as set forth in claim 1, wherein:
(a) said control means is a retractable linkage.

3. The power machine as set forth in claim 1, wherein:
(a) said control means includes an elongated rotatable rod extending the length of the boom;
(b) said elongated rotatable rod is connected at one end to said power tool assembly; and
(c) the other end of said rotatable rod has a manually operated crank, whereby the disposition of the power tool is controlled by rotation of the crank.

4. A power machine, comprising,
(a) a portable carriage which has a vertically adjustable support frame,
(b) an elongated movable boom assembly having a central section which is pivotably mounted on said support frame,
(c) a work assembly pivotally connected to said boom assembly adjacent a free end thereof, said work assembly having a power operated work member, and
(d) control means connected to said work assembly for varying the position of said work assembly about its said pivotal connection with the boom and which rigidly supports said work assembly in any desired angular disposition within a given arc of travel.

5. A power machine as set forth in claim 4, wherein said work assembly includes a rotary work disc member which has a substantially planar work surface, the angular position of which is changed by movement of said control means.

6. A power machine as set forth in claim 4 wherein said work assembly includes a support member which is pivotally connected to said boom and supports a motor which is resiliently mounted thereon, said motor being directly connected to said rotary work member.

7. A power machine as set forth in claim 4 wherein said power operated work member is resiliently supported.

8. A power machine as set forth in claim 4, wherein said power operated work member is a rotary disc-type brush.

9. A power machine as set forth in claim 4, wherein an air motor forms part of the work assembly and is directly connected to said work member.

References Cited by the Examiner
UNITED STATES PATENTS

| | | | |
|---|---|---|---|
| 2,362,161 | 11/1944 | Sellars | 173—43 X |
| 3,099,852 | 8/1963 | Grant | 15—21 X |
| 3,104,406 | 9/1963 | Rhodes | 15—21 |

CHARLES A. WILLMUTH, *Primary Examiner.*

EDWARD L. ROBERTS, *Assistant Examiner.*